(12) United States Patent
Kobayashi et al.

(10) Patent No.: US 9,561,718 B2
(45) Date of Patent: Feb. 7, 2017

(54) FUEL FILLER SYSTEMS AND METHODS OF ASSEMBLING SAME

(71) Applicants: Kazuhiro Kobayashi, Dublin, OH (US); Hidekazu Nobata, Dublin, OH (US); Masaru Tomimatsu, Dublin, OH (US); Hiroyuki Hagano, Kiyosu (JP)

(72) Inventors: Kazuhiro Kobayashi, Dublin, OH (US); Hidekazu Nobata, Dublin, OH (US); Masaru Tomimatsu, Dublin, OH (US); Hiroyuki Hagano, Kiyosu (JP)

(73) Assignees: Honda Motor Co., Ltd., Tokyo (JP); Toyoda Gosei Co., Ltd., Aichi-Ken (JP)

( * ) Notice: Subject to any disclaimer, the term of this patent is extended or adjusted under 35 U.S.C. 154(b) by 48 days.

(21) Appl. No.: 14/562,249

(22) Filed: Dec. 5, 2014

(65) Prior Publication Data

US 2015/0136768 A1    May 21, 2015

Related U.S. Application Data

(63) Continuation of application No. 14/032,982, filed on Sep. 20, 2013, now Pat. No. 9,393,866.

(51) Int. Cl.
*B60K 15/04* (2006.01)
*B65D 41/34* (2006.01)

(52) U.S. Cl.
CPC .......... *B60K 15/0409* (2013.01); *B60K 15/04* (2013.01); *B60K 15/0406* (2013.01); *B65D 41/3423* (2013.01); *B60K 2015/0458* (2013.01); *Y10T 29/49856* (2015.01)

(58) Field of Classification Search
CPC . B60K 15/0409; B60K 15/04; B60K 15/0406; B60K 2015/0458; B65D 41/3423; Y10T 29/49826
USPC .......................... 220/86.1, 86.2, 86.3; 141/350
See application file for complete search history.

(56) References Cited

U.S. PATENT DOCUMENTS

| 5,921,297 | A  | 7/1999 | Kremer et al. |
| 6,302,170 | B1 | 10/2001 | Ott |
| 6,705,481 | B2 | 3/2004 | Temmesfeld |
| 6,918,504 | B2 | 7/2005 | Miura et al. |

(Continued)

FOREIGN PATENT DOCUMENTS

| KR | 2004/0004043 | * | 1/2004 | ............. B65K 15/04 |
| KR | 20040004043 A | | 1/2004 | |
| WO | 2010026502 A1 | | 3/2010 | |

*Primary Examiner* — Fenn Mathew
*Assistant Examiner* — Elizabeth Volz
(74) *Attorney, Agent, or Firm* — Armstrong Teasdale LLP (57) ABSTRACT

A fuel filler system for use in a vehicle is provided. The system includes a fuel filler tube, a locking bracket coupled to an inner surface of the fuel filler tube, and a closure device coupleable within the tube end and including an outer wall and a radially movable tab extending from the outer wall. The tab engages the locking bracket after rotation of the closure device from a first rotational position to a second rotational position to prevent rotation of the closure device relative to the locking bracket. The closure device further includes a web flexibly connecting the tab to the outer wall and a region of weakness defined in the web, such that upon forcible rotation of the closure device from the second rotational position to the first rotational position, the region of weakness facilitates separation of the web from the outer wall.

14 Claims, 8 Drawing Sheets

(56) References Cited

U.S. PATENT DOCUMENTS

| | | |
|---|---|---|
| 6,997,339 B2 | 2/2006 | Ueki |
| 7,647,955 B2 | 1/2010 | Murabayashi et al. |
| 2001/0035415 A1 | 11/2001 | Hilger et al. |
| 2007/0056654 A1 | 3/2007 | Poley et al. |
| 2010/0078932 A1 | 4/2010 | Gurtatowski |
| 2011/0139779 A1 | 6/2011 | Muller |

* cited by examiner

FUEL FILLER SYSTEMS AND METHODS OF ASSEMBLING SAME

CROSS REFERENCE TO RELATED APPLICATIONS

This application is a continuation application of U.S. patent application Ser. No. 14/032,982, filed Sep. 20, 2013, which is incorporated herein by reference in its entirety.

BACKGROUND

The present disclosure relates generally to vehicle fuel filler systems, and more specifically, to a capless fuel filler system for use in a vehicle.

At least some known vehicles include fuel filler systems that use a fuel filler tube adapted at a first end to receive fuel and coupled at a second end to a fuel tank. The first end of the fuel filler tube is coupled to a vehicle body, typically within a recess defined a distance from an outer wall of the vehicle body. A door mounted in the outer wall provides access to the recess. It is common for a fuel cap to be removably coupled to the first end to provide access during fueling and to close the first end during operation of the vehicle. More recently, some vehicles have included capless fuel filler systems that provide access to the first end without removal of a fuel cap. At least some known capless fuel filler systems include a closure device that is coupled to the first end of the fuel filler tube. More specifically, in at least some known vehicle fuel systems, the closure device is inserted into the first end of the fuel filler tube, and is oriented to enable a fuel pump nozzle to be inserted therein.

In at least some known capless fuel filler systems, the closure devices, during operation of the vehicle, substantially seal the fuel filler tube to substantially prevent fuel fumes escaping from the fuel filler tube, and to substantially prevent water or other contaminants from entering the fuel system. In such capless fuel filler systems, no additional cover or cap is used to control access to the fuel filler tube and/or closure device, apart from the door mounted in the outer wall of the vehicle body.

In at least some known fuel filler systems, the closure device is coupled to the first end of the fuel filler tube via a snap-fit coupling mechanism. In other known fuel filler systems, the closure device is coupled to the first end of the fuel filler tube via a threaded coupling mechanism. Some such coupling mechanisms include coupling structures defined on, and in at least some instances, in, the fuel filler tube end, which may increase the complexity of the fuel filler tube ends and the costs associated with manufacturing the fuel filler tube ends.

BRIEF DESCRIPTION

In one aspect, a fuel filler system for use in a vehicle is provided. The system includes a fuel filler tube, a locking bracket, and a closure device. The fuel filler tube includes an inner surface and a tube end. The locking bracket is coupled to the inner surface of the fuel filler tube at least partially within the tube end, and includes a first end and a second end. The closure device is coupleable within the tube end, and includes an outer wall and a radially movable tab extending from the outer wall. The radially movable tab engages at least one of the first end and the second end of the locking bracket after rotation of the closure device from a first rotational position relative to the locking bracket to a second rotational position relative to the locking bracket to prevent rotation of the closure device relative to the locking bracket. The closure device further includes a web flexibly connecting the radially movable tab to the outer wall and a region of weakness defined in the web, such that upon forcible rotation of the closure device from the second rotational position to the first rotational position, the region of weakness facilitates separation of the web from the outer wall.

In another aspect, a closure device for use in a capless fuel filler system is provided. The capless fuel filler system includes a fuel filler tube. The closure device includes a first surface including an opening defined therein, a pivotable door hingedly coupled to the first surface and configured to selectively cover the opening, an outer wall extending from the first surface, a radially movable tab extending from the outer wall, a web flexibly connecting the radially movable tab to the outer wall, and a region of weakness. The radially movable tab engages a portion of the fuel filler tube after rotation of the closure device from a first rotational position relative to the fuel filler tube to a second rotational position relative to the fuel filler tube to prevent rotation of the closure device relative to the fuel filler tube. The region of weakness is defined in the web such that upon forcible rotation of the closure device from the second rotational position to the first rotational position, the region of weakness facilitates separation of the radially movable tab from the outer wall.

The features, functions, and advantages that have been discussed can be achieved independently in various embodiments or may be combined in yet other embodiments, further details of which can be seen with reference to the following description and drawings.

DETAILED DESCRIPTION

The fuel filler systems and assembly methods described herein overcome at least some of the limitations of known vehicle fuel filler systems by providing a closure device that is mounted within a fuel filler tube end such that the need for defining locking and anti-rotation structures within the filler tube end is avoided. More specifically, the fuel filler systems and assembly methods described herein provide a simplified locking bracket that couples to an inner surface of a tube end, such that costs associated with including the locking and anti-rotation structures within the tube end itself are avoided. In addition, the fuel filler systems and assembly methods described herein provide a simplified assembly of the closure device to the tube end. Moreover, the fuel filler systems and assembly methods described herein enable secure positioning of a closure device within a tube end. In addition, the fuel filler systems and assembly methods described herein provide secure anti-rotation protection that substantially prevents an undesired loosening of the closure device within the tube end. In addition, the fuel filler systems and assembly methods described herein provide for the removal of the closure device from the fuel filler tube end without having to remove or cut the fuel filler tube end.

As used herein, an element or step recited in the singular and proceeded with the word "a" or "an" should be understood as not excluding plural elements or steps unless such exclusion is explicitly recited. Furthermore, references to "one embodiment" of the present invention or the "exemplary embodiment" are not intended to be interpreted as excluding the existence of additional embodiments that also incorporate the recited features.

Figure 1:
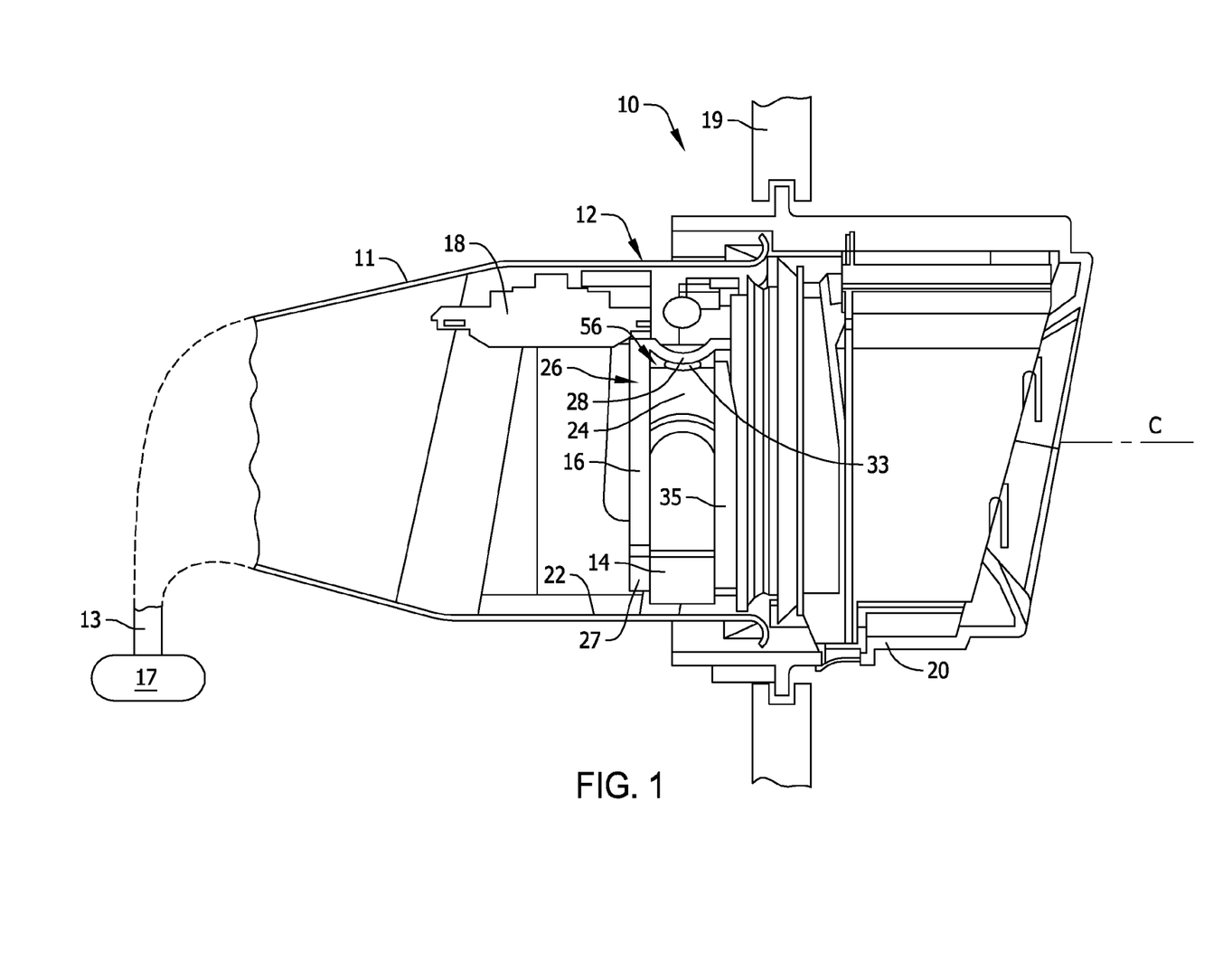
FIG. 1 is a side elevational view of an exemplary fuel filler tube end assembly.

FIGS. 1-5 illustrate an exemplary fuel filler system 10. Specifically, FIG. 1 is a side sectional view of system 10. System 10 includes a fuel filler tube 11, a closure device 16, and a locking bracket 14 used to couple closure device 16 to fuel filler tube 11. System 10 and fuel filler tube 11 used with system 10 share a common center axis C. Tube 11 includes a tube end 12. Locking bracket 14 is coupled to an inner surface 22 of tube end 12. An opposite end 13 of fuel filler tube 11 is coupled to a fuel tank 17. In the exemplary embodiment, locking bracket 14 is inserted within tube end 12 and is secured to inner surface 22 using any suitable fastening method that enables system 10 to function as described herein, such as, but not limited to, welding.

During assembly of system 10, closure device 16 is coupled to locking bracket 14. Closure device 16 includes a pivotable door 18 and an outer structure 20. Outer structure 20 is coupled to tube end 12, through interaction between closure device 16 and locking bracket 14. In the exemplary embodiment, outer structure 20 couples tube end 12 to a vehicle body 19. In the exemplary embodiment, tube end 12 and locking bracket 14 are fabricated from metallic materials. Closure device 16 also includes a first locking structure 26, a first anti-rotation structure 28, and a second locking structure 27. In the exemplary embodiment, closure device 16 is fabricated from at least one metallic material, at least one plastic material, and/or any combination of materials that enables closure device 16 to function as described herein. A first end 24 of locking bracket 14 is captured by anti-rotation structure 28. First end 24 includes an end edge 56. In the exemplary embodiment, anti-rotation structure 28 includes a resilient self-adjusting structure 33 that is sized to accommodate angular and dimensional variations of locking bracket 14 such as may be caused by variations in weld placement and component tolerances. In the exemplary embodiment, self-adjusting structure 33 is a resilient spring surface. Closure device 16 also includes a stop flange 35. In the exemplary embodiment, except as specifically described herein, closure device 16 is provided with any suitable configuration that enables fuel filler system 10 to function as described herein.

Figure 2:
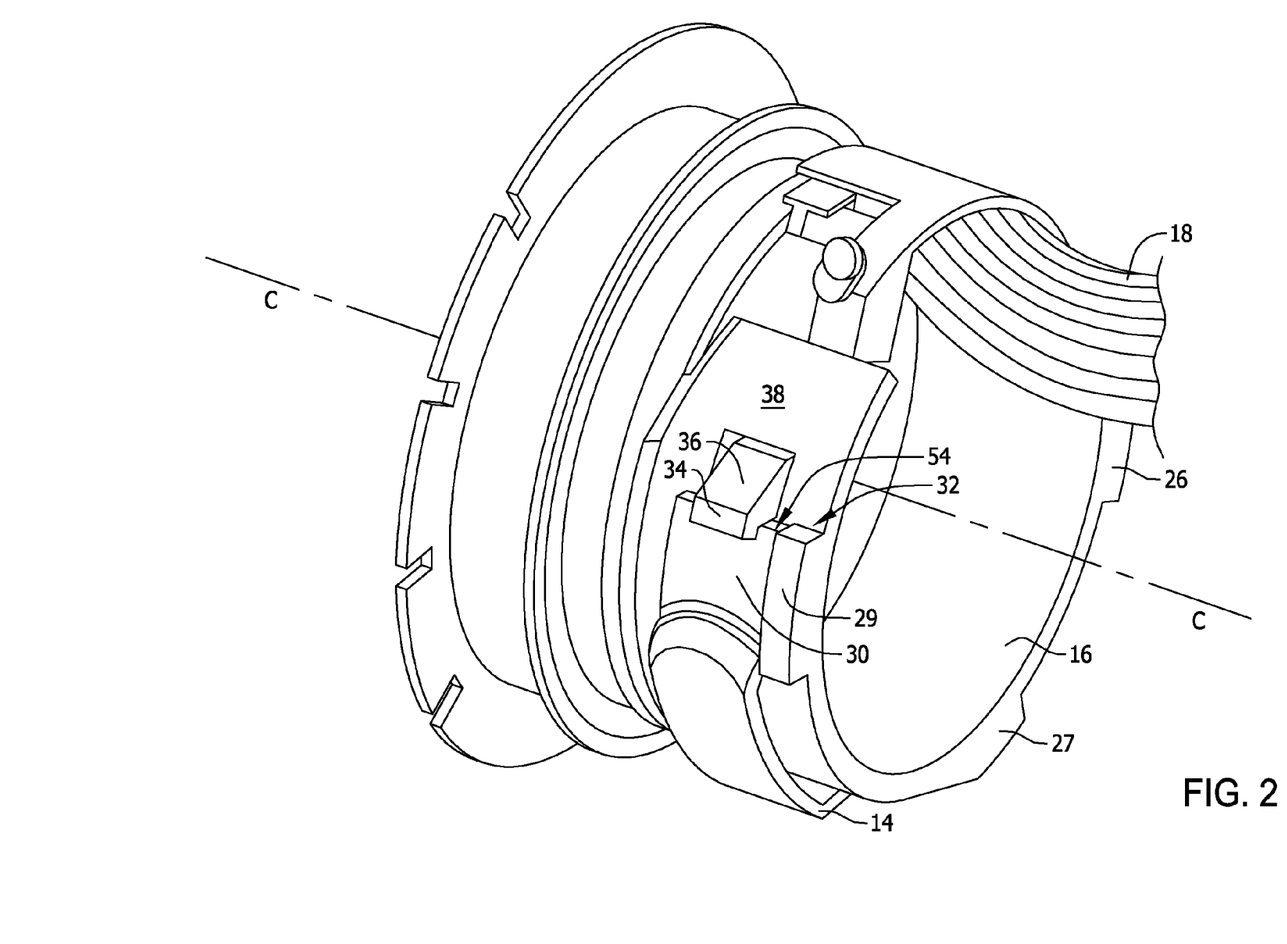
FIG. 2 is an enlarged perspective sectional view of the fuel filler tube end assembly shown in FIG. 1.

FIG. 2 is a perspective end view of locking bracket 14 and closure device 16, as viewed from an opposite side of system 10, as compared to the view of system 10 in FIG. 1. Tube end 12 (shown in FIG. 1) is omitted from FIG. 2, for simplification of the illustration. In the exemplary embodiment, locking bracket 14 is coupled to closure device 16 in part via a second end 30 that is captured by a second anti-rotation structure 32. Second end 30 includes an end edge 54. In the exemplary embodiment, second anti-rotation structure 32 includes a hook 34 extending from a movable tab 36. Tab 36 is flexibly supported as described in further detail hereinbelow, so that it can be moved inwardly and outwardly relative to a substantially cylindrical outer wall 38 of closure device 16. Closure device 16 includes a third locking structure 29. In the exemplary embodiment, locking structures 26, 27, and 29 are each circumferentially-extending flanges that extend radially outwardly from outer wall 38. Alternatively, locking structures 26, 27, and 29 have any configuration that enables system 10 to function as described herein.

Figure 3:
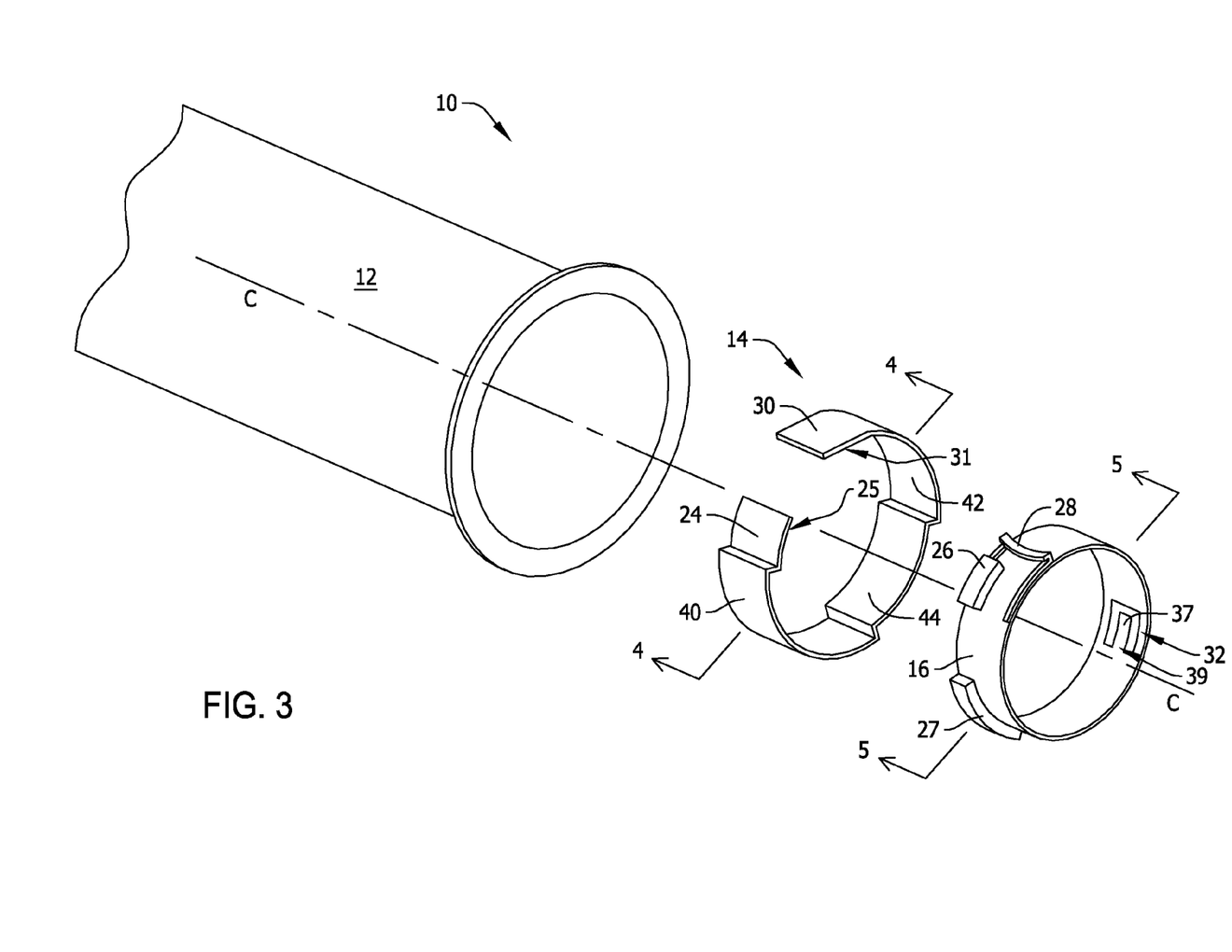
FIG. 3 is an exploded perspective view of the fuel filler tube end assembly shown in FIG. 1.
Figure 4:
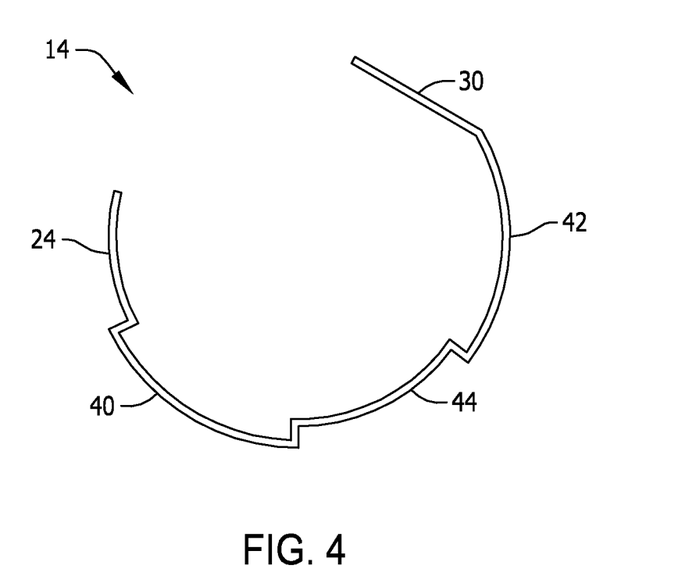
FIG. 4 is an end elevational view of an exemplary locking bracket that may be used with the fuel filler tube end assembly shown in FIG. 1.
Figure 5:
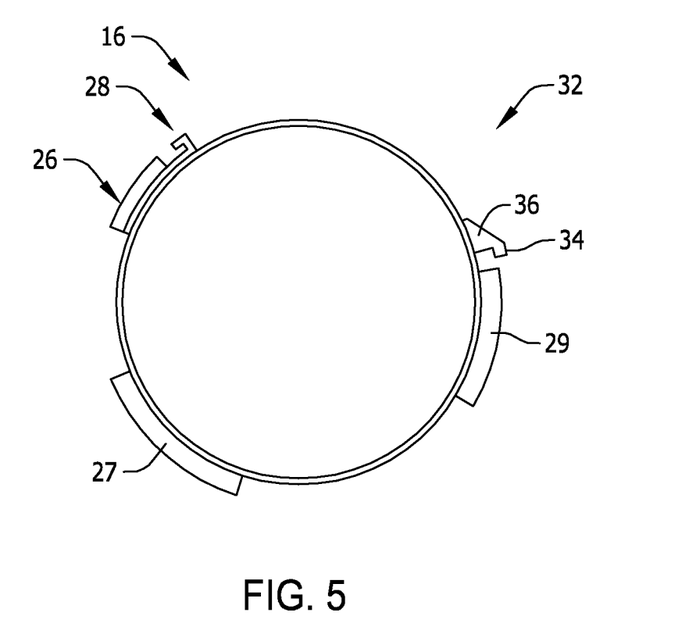
FIG. 5 is an end elevational view of an exemplary closure device that may be used with the fuel filler tube end assembly shown in FIG. 1.

FIG. 3 is a simplified perspective exploded view of system 10, including tube end 12, locking bracket 14, and closure device 16. FIG. 4 is an end elevational view of locking bracket 14, and FIG. 5 is an end elevational view of closure device 16. Outer structure 20 (shown in FIG. 1) of closure device 16 has been omitted from FIGS. 3 and 5 for simplicity of illustration. In the exemplary embodiment, locking bracket 14 has an irregular split ring shape. In addition to ends 24 and 30, locking bracket 14 includes radially outwardly-extending sections 40, and 42, and a radially inwardly-extending section 44. First end 24 includes a side edge 25, and second end 30 includes a side edge 31.

In the exemplary embodiment, locking bracket 14 includes two radially outwardly-extending sections 40 and 42, that each enable coupling of locking bracket 14 to inner surface 22 of tube end 12. In alternative embodiments, any number of radially outwardly-extending sections may be used that enables system 10 to function as described herein. Closure device 16, in particular, is illustrated in simplified form in FIG. 3 to show relative locations of locking structures 26, 27, and 29, as well as anti-rotation structures 28 and 32. In the exemplary embodiment, anti-rotation structure 32, as illustrated in FIG. 3, includes a web 37 that extends along a root portion 39 from outer wall 38. Tab 36 (FIG. 2) extends radially outwardly from web 37.

Fuel filler system 10 overcomes at least some disadvantages of, and/or provides advantages over, known fuel filler systems. Fuel filler system 10 enables the use of a tube end 12 that does not include a screw or other locking feature included therein, through the use of locking bracket 14 that is coupled to inner surface 22 of tube end 12. In addition, by avoiding the use of a tube end that includes threaded coupling mechanisms or snap-fit mechanisms that use multiple and/or high-precision pressing or other formation techniques, manufacturing costs may be reduced. Furthermore, fuel filler system 10 provides for secure coupling of closure device 16 to fuel filler tube 11 by providing anti-rotation structures 28 and 32, which facilitate secured locking of closure device 16 to locking bracket 14, and in turn, to tube end 12. Fuel filler system 10 provides additional security against removal of closure device 16 from fuel filler tube 11 through locking structures 26, 27, and 29 that engage end 24, inwardly-extending section 44, and end 30, respectively, of locking bracket 14 to prevent locking bracket 14 from being pulled out of tube end 12. In addition, fuel filler system 10 provides a mechanism in the form of self-adjusting structure 33 that accommodates variations in dimensions, shape, and/or placement of locking bracket 14 relative to tube end 12, to ensure proper alignment and positioning of closure device 16 relative to tube end 12.

Figure 6:
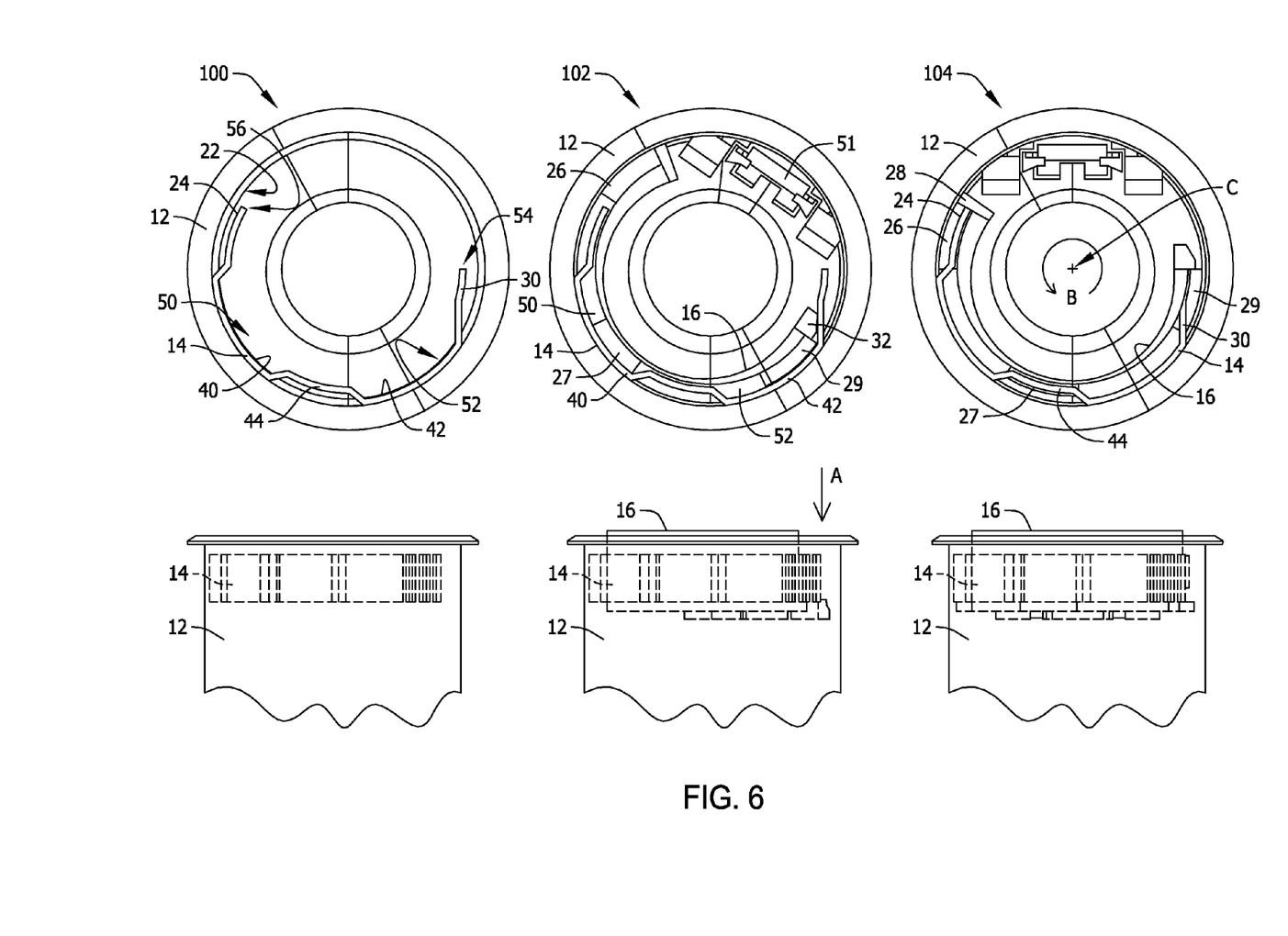
FIG. 6 is a flowchart of an exemplary method that may be implemented to mount a closure device to a fuel filler tube end.

FIG. 6 illustrates an exemplary method of assembling a fuel filler tube-closure device assembly such as system 10.

For each of steps 100-104 (illustrated from left to right in FIG. 6), an end view (upper portion of FIG. 6) and a side view (lower portion of FIG. 6) are provided. At step 100, locking bracket 14 is coupled to inner surface 22 of tube end 12, using any suitable coupling method that enables system 10 to function as described herein, such as welding. Radially outwardly-extending sections 40 and 42 are juxtaposed against inner surface 22, while radially inwardly-extending section 44 is spaced apart from inner surface 22, as are first end 24 and second end 30. Radially outwardly-extending sections 40 and 42 define pass-through channels 50 and 52, respectively.

In step 102, closure device 16 is inserted in the direction of arrow A into tube end 12. For simplicity of illustration, most of closure device 16 has been omitted, except for anti-rotation structure 28, anti-rotation structure 32, and locking structures 26, 27, and 29. Closure device 16 also includes a support structure 51 for door 18 (shown in FIGS. 1 and 2). To insert closure device 16 into tube end 12, second locking structure 27 is aligned with channel 50, and third locking structure 29 is aligned with channel 52. Accordingly, channels 50 and 52 define alignment passages for second locking structure 27 and third locking structure 29, respectively. Side edges 25 and 31 (see FIG. 3) and inwardly-extending section 44 define stop structures that prevent insertion of closure device 16 into tube end 12, absent the above-described alignment. During insertion of closure device 16 into tube end 12, second locking structure 27 passes through channel 50, and third locking structure 29 passes through channel 52. Insertion of closure device 16 into tube end 12 is completed when stop flange 35 (shown in FIG. 1) of closure device 16 engages locking bracket 14 to prevent overinsertion of closure device 16 into tube end 12. In the illustrated embodiment, tab 36 (shown in FIG. 5) is deflected radially inwardly relative to inner surface 22 during insertion of closure device 16 into tube end 12. Tab 36 may include a beveled side edge (not shown) to facilitate the radially inward deflection of tab 36.

In Step 104, closure device 16 is rotated in the direction of arrow B. After a predetermined amount of rotation, anti-rotation structure 32 engages second end 30 of locking bracket 14, deflecting second end 30 radially outwardly toward inner surface 22 of tube end 12 (shown in FIG. 1). In an alternative embodiment, tab 36 is deflected radially inwardly with respect to inner surface 22. In still another alternative embodiment, second end 30 and tab 36 are both deflected as described. After continued rotation of closure device 16 relative to locking bracket 14 in the direction of arrow B, hook 34 of tab 36 passes end edge 54 of locking bracket 14. This enables second end 30 to move radially inwardly and/or enabling tab 36 to move radially outwardly, such that end edge 54 is captured by hook 34. During rotation of closure device 16 relative to locking bracket 14, anti-rotation structure 28 engages end edge 56 of first end 24. Once locking bracket 14 has been captured at ends 24 and 30 by anti-rotation structure 28 and anti-rotation structure 32, respectively, further rotation of closure device 16 relative to locking bracket 14 and tube end 12 is substantially prevented. Moreover, locking structures 26, 27, and 29 (shown in FIGS. 1 and 2) define anti-removal structures that prevent closure device 16 from being pulled out of tube end 12. In an alternative embodiment, any number of flanges or other anti-removal structures are provided that enables system 10 to function as described herein.

In the exemplary embodiment, it may become necessary at some point in time after assembly of system 10 to remove closure device 16 from fuel filler tube 11. Removal of closure device 16 involves disengaging closure device 16 from locking bracket 14. To disengage closure device 16 from locking bracket 14, closure device 16 is rotated in a direction opposite to the direction of arrow B (shown in FIG. 6). Upon application of a twisting force to closure device 16 in excess of a predetermined amount, web 37 breaks away from outer wall 38 along root portion 39, enabling web 37 and tab 36 to fall free from outer wall 38 of closure device 16. After web 37 and tab 36 have separated from closure device 16, further rotation of closure device 16 in the direction opposite to arrow B enables alignment of second locking structure 27 with channel 50, and alignment of third locking structure 29 with channel 52. Closure device 16 can then be withdrawn from fuel filler tube 11, as second locking structure 27 passes through channel 50, and third locking structure 29 passes through channel 52.

Figure 7:
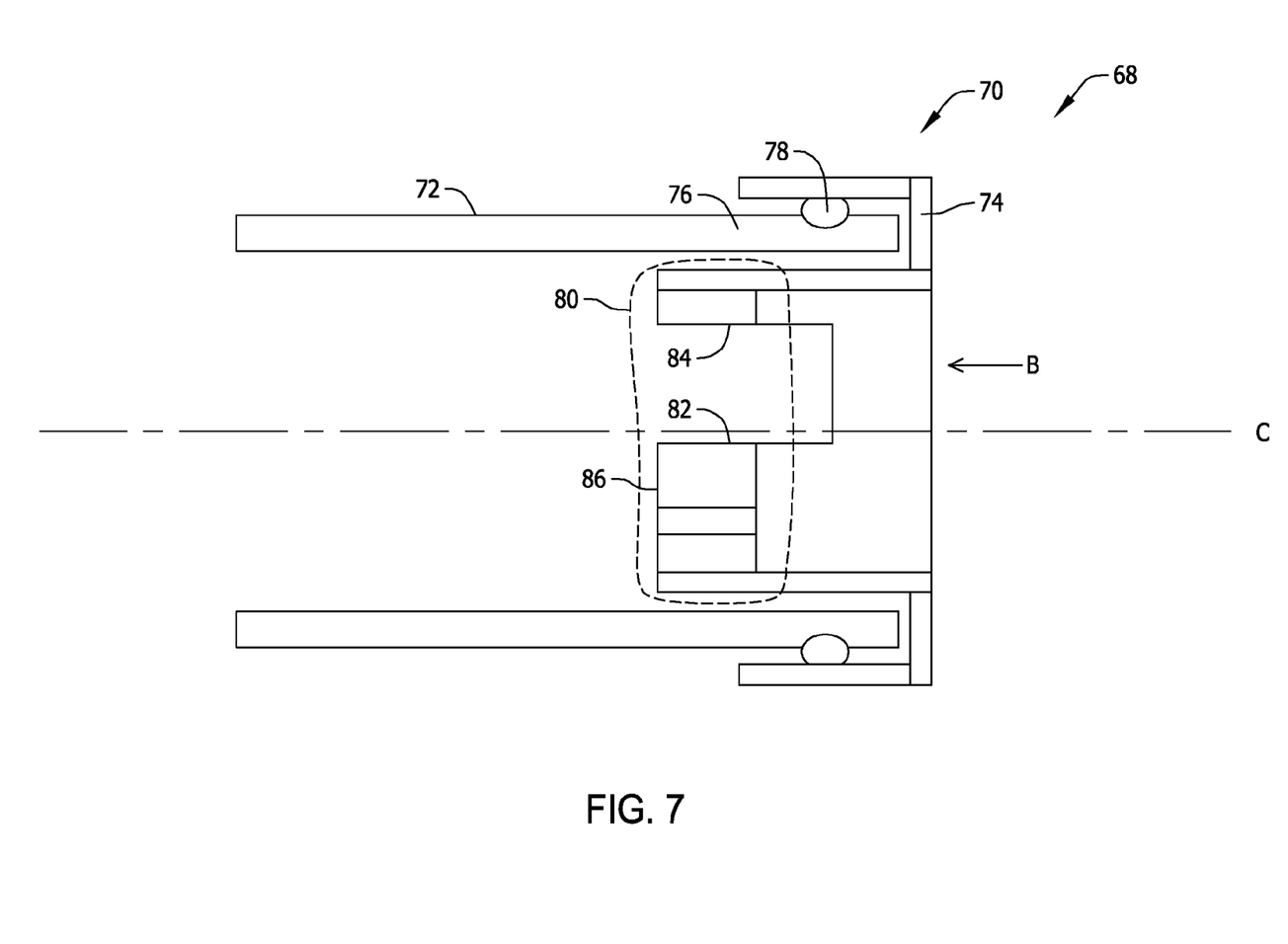
FIG. 7 is a side sectional view of an alternative fuel filler tube end assembly.

FIG. 7 is a schematic side sectional view of an alternative embodiment 68 of the exemplary fuel filler system 10 shown in FIGS. 1-6. Fuel filler system 68 includes a closure device (not shown) that in the illustrated embodiment has the same or a similar configuration as closure device 16 shown in FIGS. 1-3 and 5-6. In the alternative embodiment, system 68 includes a fuel filler tube—sealing bracket assembly 70. In the illustrated embodiment, assembly 70 includes a fuel filler tube 72 that is fabricated from at least one non-metallic material, such as but not limited to, high-density polyethylene. Instead of metallic locking bracket 14 (shown in FIG. 1) included in system 10, assembly 70 includes a sealing bracket 74. In the exemplary embodiment, sealing bracket 74 is fabricated from at least one non-metallic material, such as high-density polyethylene. Alternatively, fuel filler tube 72 and sealing bracket 74 may be fabricated from any suitable materials that enable assembly 70 to function as described herein. Sealing bracket 74 is coupled to an end 76 of fuel filler tube 72 via a sealing member 78.

In the illustrated embodiment, sealing bracket 74 includes a locking portion 80 that has a configuration similar to the configuration of locking bracket 14 of FIGS. 1-4. More specifically, locking portion 80, viewed in the direction of arrow B, has a configuration that is the same or substantially similar to that of locking bracket 14 as shown in FIG. 4. For example, locking portion 80 includes end edges 82 and 84 that are configured to be captured by anti-rotation structures such as anti-rotation structures 28 and 32 of closure device 16 (shown in FIGS. 1-3). Moreover, locking portion 80 includes an end edge 86 configured to cooperate with locking structures, such as locking structures 26, 27, and 29 (shown in FIG. 5) of system 10. Accordingly, a closure device (not shown in FIG. 7) that is configured similarly to closure device 16 of system 10 (shown in FIGS. 1-3), can be assembled with sealing bracket 74 and fuel filler tube 72 in a manner substantially similar to the method described with respect to FIG. 6.

Accordingly, fuel filler system 68 functions in a manner similar to the manner in which system 10 functions, and offers the same or similar advantages as system 10, and overcomes disadvantages of at least some known fuel filler systems in the same manner as system 10. Specifically, system 68 uses a simplified tube end 76 without the need for coupling or locking structures formed thereon. In addition, system 68 provides a sealing bracket 74 that includes a locking portion 80 spaced apart from tube end 76 that cooperates with a closure device (not shown in FIG. 7) that is configured the same or similar to closure device 16 described above, to provide for improved resistance to rotation of the closure device, and resistance to removal of the closure device after coupling with sealing bracket 74.

Figure 8:
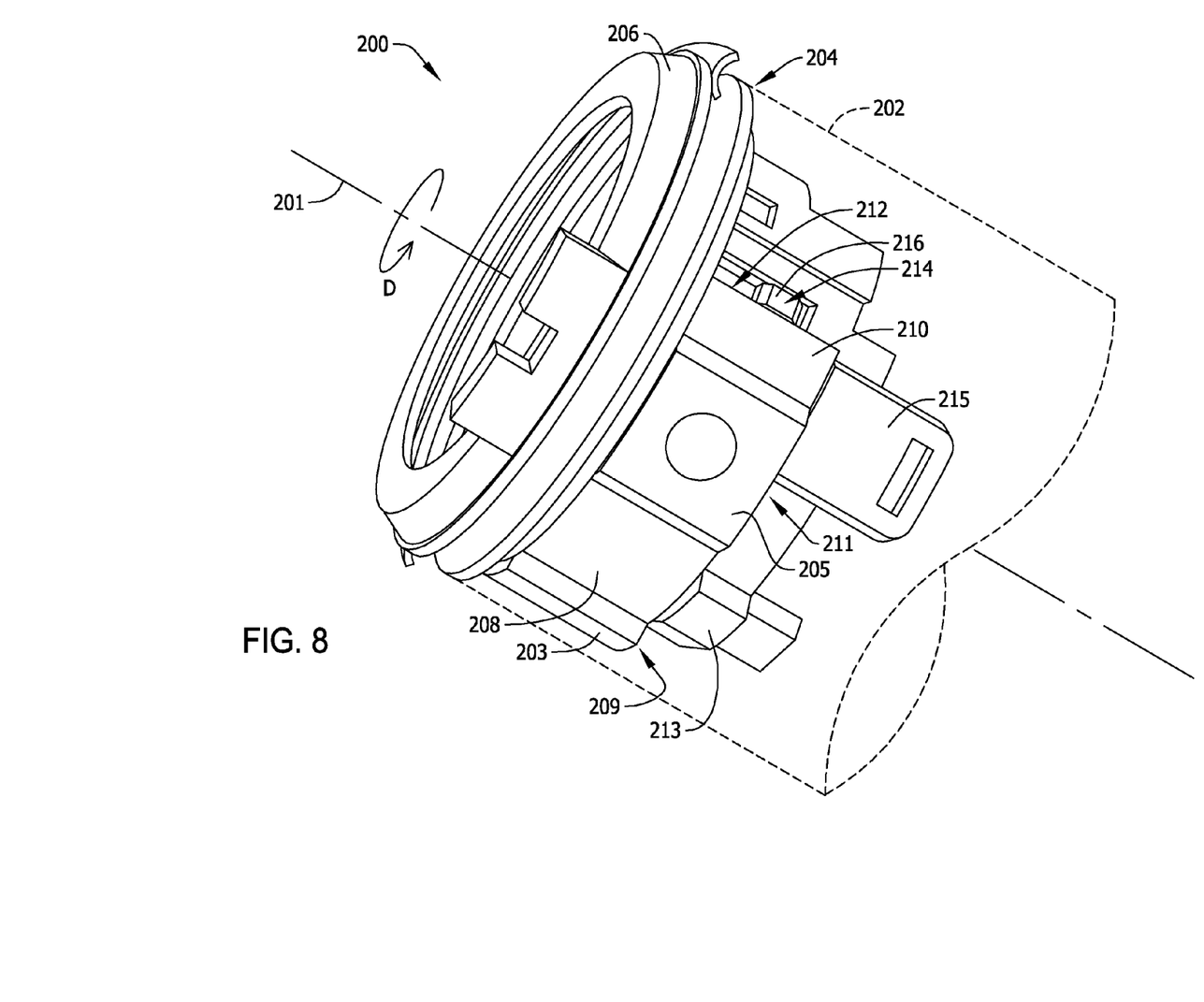
FIG. 8 is a perspective view of an alternative fuel filler tube end assembly.
Figure 9:
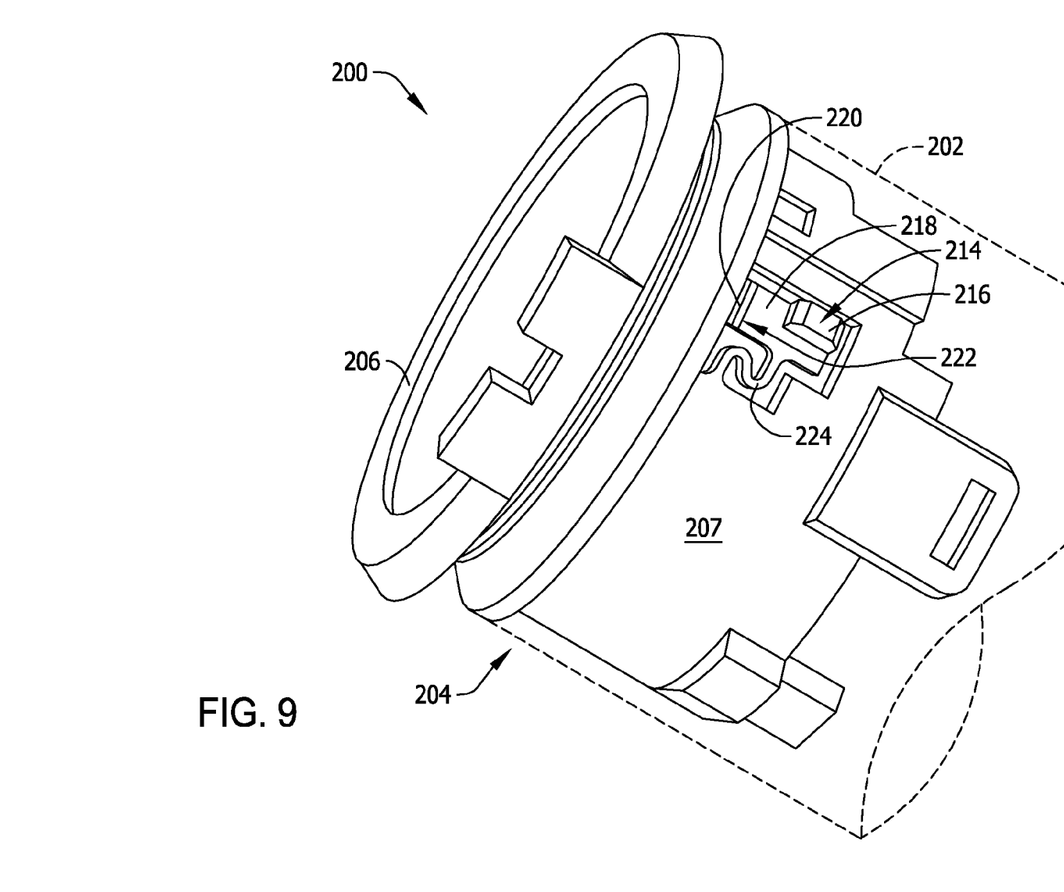
FIG. 9 is another perspective view of the fuel filler tube end assembly shown in FIG. 8.

FIGS. 8 and 9 illustrate another alternative embodiment of the exemplary fuel filler system 10 shown in FIGS. 1-6. FIG. 8 is a perspective view of fuel filler system 200. Fuel filler system 200 is similar to system 10 shown in FIGS. 1-6 and includes a fuel filler tube 202 having a tube end 204 oriented thereon, and a closure device 206. Closure device 206 is illustrated in FIG. 8 in its installed orientation relative to tube end 204, supported by and in engagement with a locking bracket 208 oriented within tube end 204. Installation of closure device 206 is accomplished in a manner similar to the insertion of closure device 16 into tube end 12, in system 10.

In the exemplary embodiment, locking bracket 208 is substantially similar to locking bracket 14 shown in FIGS. 3, 4, and 6, and includes outwardly-extending sections 203 and 205 that, after insertion and coupling of closure device 206 within tube end 204 define channels 209 and 211 that are similar to channels 50 and 52 shown in FIG. 6. Channels 209 and 211 define alignment passages for locking structures 213 and 215, respectively, similar to the manner in which channels 50 and 52 define alignment passages for second locking structure 27 and third locking structure 29, respectively, in the embodiment shown in FIGS. 1-6. Locking structures 213 and 215 are oriented on closure device 206 and pass through channels 209 and 211, respectively, when closure device 206 is inserted into tube end 204. An anti-rotation structure 214 is flexibly supported on closure device 206, as described in further detail hereinbelow. Anti-rotation structure 214 includes a tab 216 that extends alongside an edge 212 of an end 210 of locking bracket 208.

FIG. 9 is a perspective view of fuel filler system 200 in which locking bracket 208 (shown in FIG. 8) is omitted. Closure device 206 is shown in FIG. 9 inserted into tube end 204 of fuel filler tube 202. In the exemplary embodiment, anti-rotation structure 214 includes a web 218 that supports tab 216. A region of weakness 222 is defined in root portion 220 of web 218. More specifically, in the exemplary embodiment, region of weakness 222 facilitates the separation of web 218 from closure device 206 for example, during removal of closure device 206 from tube end 204. For example, in one embodiment, region of weakness 222 may be configured as a crease or score line extending across web 218. In alternative embodiments, region of weakness 222 is defined in any suitable manner that enables system 200 to function as described herein. Anti-rotation structure 214 also includes a tether member 224 extending from web 218 to outer wall 207.

As described hereinabove with respect to the exemplary embodiment shown in FIGS. 1-6, it may become necessary, after assembly of fuel filler system 200, to remove closure device 206 from fuel filler tube 202. To remove closure device 206 from tube end 204, closure device 206 is rotated, e.g., in a clockwise direction about a centerline 201 (shown in FIG. 8), as shown by arrow D. Upon application of a predetermined amount of twisting force on closure device 206, edge 212 of bracket end 210 pushes against tab 216 and causes web 218 to break away from root portion 220 along region of weakness 222. Web 218 remains coupled to outer wall 207 via tether member 224. Accordingly, tether member 224 precludes web 218 and tab 216 from falling down into fuel filler tube 202. If web 218 and tab 216 were to fall down fuel filler tube 202, damage to the vehicle's fuel system and/or engine could result. Continued rotation of closure device 206 in the direction of arrow D causes locking structures 213 and 215 to become aligned with channels 209 and 211, respectively, enabling closure device 206 to be withdrawn from tube end 204.

Accordingly, fuel filler system 200 functions in a manner similar to the manner in which system 10 functions, and offers the same or similar advantages as system 10, and overcomes disadvantages of at least some known fuel filler systems in the same manner as system 10. Specifically, system 200 uses a simplified tube end 204 without the need for coupling or locking structures formed thereon. In addition, system 200 provides locking bracket 208 that cooperates with closure device 206 to provide for improved resistance to rotation of closure device 206, and resistance to removal of closure device 206 after coupling of locking bracket 208. Furthermore, fuel filler system 200 provides for the removal of closure device 206, without cutting or removal of fuel filler tube 202, and without leaving pieces of closure device 206 remaining within fuel filler tube 202.

Exemplary embodiments of fuel filler systems and methods of assembly are described above in detail. The systems and methods are not limited to the specific embodiments described herein, but rather, components of the systems and/or steps of the methods may be utilized independently and separately from other components and/or steps described herein. For example, the systems and methods described herein may be used with both capless and non-capless fuel filler system closure devices. In addition, the systems may be used in combination with other manufacturing systems and methods, and is not limited to practice with only the manufacturing systems and methods as described herein. Rather, an exemplary embodiment can be implemented and utilized in connection with many other vehicle assembly system applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A fuel filler system for use in a vehicle, said system comprising:
   a fuel filler tube including an inner surface and a tube end;
   a locking bracket coupled to the inner surface of said fuel filler tube at least partially within said tube end, wherein said locking bracket includes a first end and a second end; and
   a closure device coupleable within said tube end and including an outer wall and a radially movable tab extending from said outer wall, wherein said radially movable tab engages at least one of said first end and said second end of said locking bracket after rotation of said closure device from a first rotational position relative to said locking bracket to a second rotational position relative to said locking bracket to prevent rotation of said closure device relative to said locking bracket, said closure device further comprising a web flexibly connecting said radially movable tab to said outer wall and a region of weakness defined in said web, such that upon forcible rotation of said closure device from said second rotational position to said first rotational position, said region of weakness facilitates separation of said web from said outer wall.

2. The fuel filler system in accordance with claim 1, wherein said radially movable tab is configured to deflect inwardly during at least one of insertion of said closure device into said tube end and rotation of said closure device from the first rotational position to the second rotational position.

3. The fuel filler system in accordance with claim 1, wherein said radially movable tab is configured to accommodate dimensional variations in said locking bracket.

4. The fuel filler system in accordance with claim 1, said closure device further comprising a tether member that flexibly couples at least one of said web and said radially movable tab to said outer wall.

5. The fuel filler system in accordance with claim 4, wherein said tether member couples said radially movable tab to said outer wall even when said radially movable tab is no longer coupled to said outer wall by said web.

6. The fuel filler system in accordance with claim 1, said closure device further comprising an insertion limiting structure for precluding over insertion of said closure device into said fuel filler tube.

7. The fuel filler system in accordance with claim 6, wherein said insertion limiting structure comprises at least one flange extending from said outer wall of said closure device.

8. A closure device for use in a capless fuel filler system, the capless fuel filler system including a fuel filler tube, said closure device comprising:
 a first surface that includes an opening defined therein;
 a pivotable door hingedly coupled to said first surface and configured to selectively cover said opening;
 an outer wall extending from said first surface;
 a radially movable tab extending from said outer wall, wherein said radially movable tab engages a portion of the fuel filler tube after rotation of said closure device from a first rotational position relative to the fuel filler tube to a second rotational position relative to the fuel filler tube to prevent rotation of said closure device relative to the fuel filler tube;
 a web flexibly connecting said radially movable tab to said outer wall; and
 a region of weakness defined in said web, such that upon forcible rotation of said closure device from the second rotational position to the first rotational position, said region of weakness facilitates separation of said radially movable tab from said outer wall.

9. The closure device in accordance with claim 8, wherein said radially movable tab is configured to deflect inwardly during at least one of insertion of said closure device into an end of the fuel filler tube and rotation of said closure device from the first rotational position to the second rotational position.

10. The closure device in accordance with claim 8, wherein said radially movable tab is configured to accommodate dimensional variations in the fuel filler tube.

11. The closure device in accordance with claim 8, said closure device further comprising a tether member that flexibly couples at least one of said web and said radially movable tab to said outer wall.

12. The closure device in accordance with claim 11, wherein said tether member couples said radially movable tab to said outer wall even when said radially movable tab is no longer coupled to said outer wall by said web.

13. The closure device in accordance with claim 8, said closure device further comprising an insertion limiting structure for precluding over insertion of said closure device into the fuel filler tube.

14. The closure device in accordance with claim 13, wherein said insertion limiting structure comprises at least one flange extending from said outer wall of said closure device.

\* \* \* \* \*